US011946166B2

(12) United States Patent
Liu et al.

(10) Patent No.: US 11,946,166 B2
(45) Date of Patent: Apr. 2, 2024

(54) ANTI-COUNTERFEITING MODAL FIBER, PREPARATION METHOD AND ANTI-COUNTERFEITING METHOD

(71) Applicant: SOOCHOW UNIVERSITY, Suzhou (CN)

(72) Inventors: Yuqing Liu, Suzhou (CN); Qin Li, Suzhou (CN); Xingxing Li, Suzhou (CN); Yeke Zhang, Suzhou (CN); Zhong Wang, Suzhou (CN); Guohe Wang, Suzhou (CN); Zhijuan Pan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 333 days.

(21) Appl. No.: 17/618,317

(22) PCT Filed: May 20, 2021

(86) PCT No.: PCT/CN2021/094789
§ 371 (c)(1),
(2) Date: Dec. 10, 2021

(87) PCT Pub. No.: WO2022/100052
PCT Pub. Date: May 19, 2022

(65) Prior Publication Data

US 2022/0364271 A1 Nov. 17, 2022

(30) Foreign Application Priority Data

Nov. 11, 2020 (CN) ......................... 202011256945.1

(51) Int. Cl.
*D01F 2/08* (2006.01)
*D01D 1/02* (2006.01)
(Continued)

(52) U.S. Cl.
CPC ................ *D01F 2/08* (2013.01); *D01D 1/02* (2013.01); *D01D 5/06* (2013.01); *D01F 1/10* (2013.01);
(Continued)

(58) Field of Classification Search
CPC .... D01F 2/08; D01F 1/10; D01D 1/02; D01D 5/06; G07D 7/02; G07D 7/06; D10B 2201/22; D10B 2505/00
See application file for complete search history.

(56) References Cited

U.S. PATENT DOCUMENTS

2015/0377841 A1 12/2015 Gaynor et al.
2018/0059090 A1 3/2018 Gaynor et al.

FOREIGN PATENT DOCUMENTS

CN 1341176 A * 3/2002 ............. B01J 45/00
CN 101307511 A 11/2008
(Continued)

*Primary Examiner* — Jamil Ahmed
(74) *Attorney, Agent, or Firm* — SZDC Law PC

(57) ABSTRACT

The invention relates to a method for preparing an anti-counterfeiting modal fiber, including: mixing a pulp stock solution with a cellulose catalyst, alkalizing, aging, sulfonating, and then dissolving the pulp stock solution in an alkaline solution to obtain a treatment solution; mixing the treatment solution with multiple amino acid-metal chelates, filtering, defoaming and ripening to obtain a spinning stock solution; and mixing the spinning stock solution with a spinning bath additive, and wet spinning, followed by drafting, defoaming, desulfurizing, water washing, and other post-treatments, to obtain an anti-counterfeiting modal fiber, wherein the amino acid metal-chelates account for 0.5%-1.5% by weight of the spinning stock solution. Amino acid-metal chelates are used to anti-counterfeit and encrypt the modal fibers, and the anti-counterfeiting and encrypting is involved in the spinning stock solution of modal fibers.
(Continued)

The fiber source can be tracked and identified by detecting the species of metal elements and amino acids.

9 Claims, 1 Drawing Sheet

(51) Int. Cl.
*D01D 5/06* (2006.01)
*D01F 1/10* (2006.01)
*G07D 7/02* (2016.01)
*G07D 7/06* (2006.01)
(52) U.S. Cl.
CPC ................ *G07D 7/02* (2013.01); *G07D 7/06* (2013.01); *D10B 2201/22* (2013.01); *D10B 2505/00* (2013.01)

(56) References Cited

FOREIGN PATENT DOCUMENTS

| | | | |
|---|---|---|---|
| CN | 101942707 | A | 1/2011 |
| CN | 105308236 | A | 2/2016 |
| CN | 109321993 | A | 2/2019 |
| CN | 110042490 | A | 7/2019 |
| CN | 112501705 | A | 3/2021 |
| CN | 112501706 | A | 3/2021 |
| CN | 112538664 | A | 3/2021 |
| CN | 112609257 | A | 4/2021 |
| DE | 102017112370 | A1 | 12/2017 |
| WO | 2017211807 | A1 | 12/2017 |

* cited by examiner

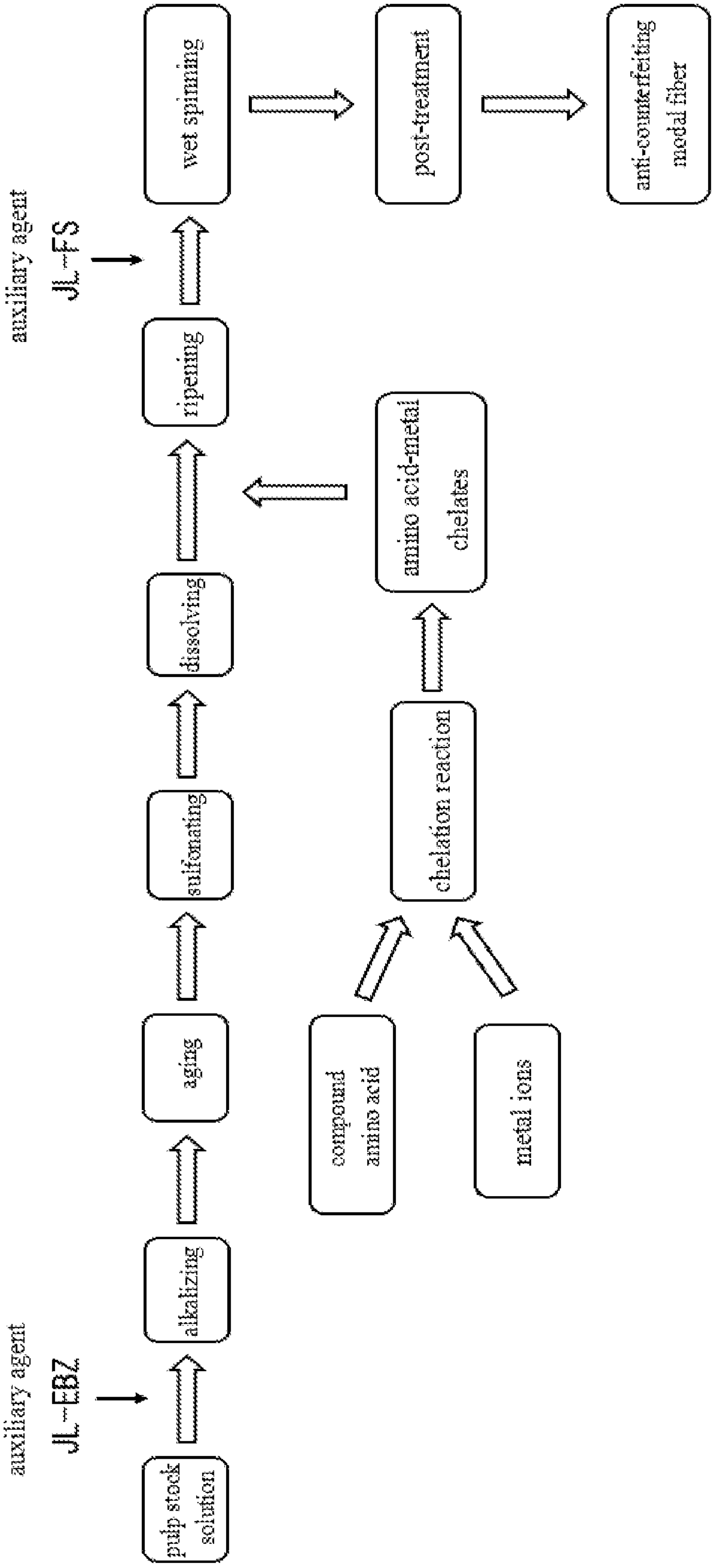
pulp stock solution
auxiliary agent
JL-EBZ
alkalizing
aging
sulfonating
dissolving
ripening
auxiliary agent
JL-FS
wet spinning
post-treatment
anti-counterfeiting modal fiber
compound amino acid
metal ions
chelation reaction
amino acid-metal chelates

ANTI-COUNTERFEITING MODAL FIBER, PREPARATION METHOD AND ANTI-COUNTERFEITING METHOD

This application is the National Stage Application of PCT/CN2021/094789, filed on May 20, 2021, which claims priority to Chinse Patent Application No. 202011256945.1, filed on Nov. 11, 2020, which is incorporated by reference for all purposes as if fully set forth herein.

FIELD OF THE INVENTION

The present invention relates to an anti-counterfeiting fiber, and more particularly to an anti-counterfeiting modal fiber, a preparation method and an anti-counterfeiting method.

DESCRIPTION OF THE RELATED ART

At present, chemical fibers dominate the main matrix of anti-counterfeiting fibers, and most of the currently known anti-counterfeiting fibers are identified by the color of the fibers, and their sources cannot be traced. For example, the anti-counterfeiting fiber in Chinese Patent No. CN207193675U has a specific color structure. Different specific color structures have particular color characteristics that are perceived by the human eyes under sunlight. This type of anti-counterfeiting fibers is spherical or ellipsoidal, and mostly used in paper materials. In Chinese Patent No. CN205557182U, an anti-counterfeiting mark is formed by providing color dots on the fibers to form a specific color pattern, which is also mainly used in paper products. In addition, an anti-counterfeiting mark formed by taking advantage of the fiber morphology and their superposition effect is also popular in the use of anti-counterfeiting fibers. For example, in Chinese Patent No. CN2716320Y, a fiber body is formed by geometric cross sections composed of an upper and a lower surface in concave-convex shielding structures, and at least two characteristic patterns can be seen from the upper surface or the lower surface due to visual difference, or different characteristic patterns can be seen when viewed from different angles. The anti-counterfeiting fiber is mainly used in anti-counterfeiting paper, anti-counterfeit packages, and others.

At present, the development and application of amino acid-metal chelates are mainly in the fields of animal feed and plant fertilizers. For example, in Chinese Patent No. CN103535521A, amino acid-chelated copper is added to animal feed, to enhance the activity of enzymes in animals, increase the utilization of proteins, fat and vitamins, and thus improve the growth of animals. However, no use of amino acid-metal chelates in the preparation of anti-counterfeiting materials is disclosed in the art at present.

SUMMARY OF THE INVENTION

To solve the above technical problems, an object of the present invention is to provide an anti-counterfeiting modal fiber, a preparation method and an anti-counterfeiting method. In the anti-counterfeiting modal fiber of the present invention, numerous amino acid-metal chelates are used to anti-counterfeit and encrypt the modal fibers, and the anti-counterfeiting identification can be achieved by detecting and encoding the species of metal elements and amino acid.

A first object of the present invention is to provide use of amino acid-metal chelates as an anti-counterfeiting tracer in an anti-counterfeiting modal fiber.

The use refers to the addition of amino acid-metal chelates as an anti-counterfeiting tracer during the preparation of modal fibers to prepare an anti-counterfeiting modal fiber.

A second object of the present invention is to provide a method for preparing an anti-counterfeiting modal fiber, which comprises the following steps:

(1) mixing a pulp stock solution with a cellulose catalyst, alkalizing, aging, sulfonating, and then dissolving the pulp stock solution in an alkaline solution to obtain a treatment solution; and (2) mixing the treatment solution uniformly with a variety of amino acid-metal chelates, filtering, defoaming and ripening to obtain a spinning stock solution; and mixing the spinning stock solution uniformly with a spinning bath additive, and wet spinning, followed by drafting, defoaming, desulfurizing, water washing, and other post-treatments, to obtain the anti-counterfeiting modal fiber, where the amino acid metal-chelates account for 0.5%-1.5% by weight of the spinning stock solution.

Preferably, in Step (1), the cellulose catalyst is JL-EBZ (Shandong Mole Chemical Co., Ltd) and the cellulose catalyst accounts for 0.3%-1.8% by weight of the pulp stock solution.

Preferably, in Step (1), the pulp stock solution has a degree of polymerization of ≥850, and a methylcellulose content of ≥92%. Preferably, the pulp stock solution includes cotton pulp, wood pulp or bamboo pulp.

Preferably, in Step (1), the concentration of the alkaline solution for alkalization is 15-25 g/L, and the alkalization continues for 3-4 hrs at 10-18° C., where the bath ratio is 1:6-10.

Preferably, in Step (1), the aging time is 4-5 hrs, and the temperature is 14-20° C.

Preferably, in Step (1), $CS_2$ is used for sulfonation. The weight ratio of $CS_2$ to the pulp stock solution is 1:120-150. The sulfonation temperature is 55-75° C., and the treatment time is 1-2.5 hrs.

Preferably, in Step (1), the pulp stock solution after treatment is dissolved in a 40-100 g/L aqueous sodium hydroxide solution, where the bath ratio is 1:3-5.

Preferably, in Step (2), the amino acid-metal chelates includes an amino acid and a metal ion chelated with the amino acid, where the molar ratio of the amino acid to the metal ion is 2-3:1.

Preferably, the amino acid is selected from tyrosine, lysine, leucine, valine, phenylalanine and any combination thereof.

Preferably, the metal ion is selected from a copper ion, a calcium ion, an iron ion and any combination thereof.

Preferably, the metal ions in the plurality of amino acid-metal chelates are the same, but the amino acids are different.

Preferably, the amino acid-metal chelate is prepared through the following steps:

mixing a metal compound and an amino acid in water uniformly, adjusting the pH of the mixture, and separating the amino acid-metal chelate after the reaction is complete.

Preferably, the amino acid is a compound amino acid. The conditions for the chelation reaction between the compound amino acid and copper ions include: pH 10-11, a reaction temperature of 60-65° C., and a reaction time of 30 min. The conditions for the chelation reaction between the compound amino acid and calcium ions include: pH 6-8, a reaction temperature of 55-65° C., and a reaction temperature of 30 min. The conditions for the chelation reaction between the compound amino acid and iron ions include: pH 5-6, a reaction temperature of 25-30° C., and a reaction time of 30 min.

Preferably, in Step (2), the spinning bath additive is JL-FS (Shandong Mole Chemical Co., Ltd), and the spinning bath additive accounts for 0.1%-0.25% by weight of the spinning stock solution.

Preferably, in Step (2), the ripening time is 6-8 hrs, and the treatment temperature is 10-20° C.

Preferably in Step (2), the wet spinning is low-speed spinning, and the spinning speed is 28-33 m/min; high drafting is performed in a coagulation bath, with a total drafting rate of 75%-85%; and low drafting is performed in post-treatment, with a total drafting rate of 20%-30%.

Preferably, in Step (2), the spinning nozzle for wet spinning has a specification of Φ0.05 mm×36000 holes.

Preferably, in Step (2), the temperature of the coagulation bath required for the drafting is 35-55° C., the coagulation bath includes 80-100 g/L of sulfuric acid, 70-90 g/L of zinc sulfate, and 130-150 g/L of sodium sulfate, and the immersion time is 1-2 sec.

Preferably, in Step (2), the defoaming is performed for 0.5-1 hr by immersing the new fibers in a defoaming agent with a concentration of 0.5%-1.2%, where the bath ratio is 1:10-15.

Preferably, in Step (2), the desulfurization is performed for 3-4 hrs in a 2-3 g/L sodium hydroxide solution at a temperature of 75-85° C., where the bath ratio is 1:10-15.

Preferably, in Step (2), the water washing is performed for 2-3 hrs with hot water at 75-90° C., where the bath ratio 1:15-25.

Preferably, the post-treatment also includes the step of drying treatment at a temperature of 70-85° C.

A third object of the present invention is to provide an anti-counterfeiting modal fiber prepared by the method as described above, which comprises modal fibers and multiple amino acid-metal chelates distributed in the modal fibers, where the amino acid-metal chelates account for 0.5%-1.5% by weight of the anti-counterfeiting modal fiber.

In the present invention, the anti-counterfeiting modal fiber is traceable and highly anti-counterfeiting. The anti-counterfeiting modal fiber prepared in the present invention has specific anti-counterfeiting code. The yarns and fabrics or related textiles prepared with the anti-counterfeiting modal fiber can all be traced to the sources of raw materials through the anti-counterfeiting code and thus are traceable. The anti-counterfeiting code of the modal fiber in the present invention is encoded and encrypted by multiple amino acids and multiple metal elements in combination, thus having extremely high anti-counterfeiting power.

A fourth object of the present invention is to provide an anti-counterfeiting method using the anti-counterfeiting modal fiber, which comprises an encryption step, and a decryption and identification step, where

- the encryption step comprises encoding the anti-counterfeiting modal fiber according to the species and amounts of the amino acid-metal chelates, and sending encrypted information; and
- the decryption and identification step comprises obtaining the encrypted information, and testing the species and amounts of amino acids and metal ions in the modal fiber; and then comparing the species and amounts with the obtained encrypted information to identify the authenticity of the modal fiber.

More preferably, the encryption step can be carried out at the same time with the preparation of the anti-counterfeiting modal fiber. The encoding information table is also designed. The encoding is performed according to the species and amounts of amino acids and metal ions contained in the amino acid-metal chelates, and different amino acids and different metal ions are encoded with different serial numbers. For example, different English letters are used to number the amino acids, and different Arabic numerals are used to number the metal ions. When encrypted, they are ranked according to the amounts of amino acids and metal ions, for example, in descending order of contents. After the two are combined, a string of authentic fiber numbers can be obtained.

Preferably, in the decryption and identification step, after determining the species and amounts of amino acids and metal ions in the modal fiber, they can be compared with the obtained encrypted information (including the authentic fiber numbers and the encoding information table). If they match the authentic fiber numbers, then the fiber is identified as an authentic fiber, or otherwise it is identified as a counterfeit.

Preferably, the species and contents of amino acids are determined by capillary electrophoresis/mass spectrometry technology, and the species and contents of metal elements are detected by inductively coupled plasma spectroscopy.

By means of the above technical solutions, the present invention has the following advantages.

In the present invention, an anti-counterfeiting modal fiber and a preparation method thereof are provided. Amino acid-metal chelates are used to anti-counterfeit and encrypt the modal fibers, and the anti-counterfeiting and encrypting area in the present invention is in the spinning stock solution of modal fibers, whereby modal fibers containing particular species of metal elements and amino acids are obtained. The fiber source can be tracked and identified by detecting the species of metal elements and amino acids, where the species of metal elements and amino acids are encoded with letters or numerals to form a unique block cryptogram.

In the present invention, the species and contents of metal elements and amino acids are used as the anti-counterfeiting mark. The anti-counterfeiting mark for the anti-counterfeiting modal fiber is inside the fiber, which does not affect the mechanical properties of the modal fiber. Moreover, the anti-counterfeiting mark for the anti-counterfeiting modal fiber is readily detectable and long lasting, provides effective encryption and traceability. The fiber source can be tracked according to the anti-counterfeiting code. The anti-counterfeiting modal fiber of the present invention has the advantage of high anti-counterfeiting power, being difficult to counterfeit, and simple preparation process where the complexity of the modal fiber preparation process is not increased, thus having a good prospect of application in the market.

The above description is only a summary of the technical solutions of the present invention. To make the technical means of the present invention clearer and implementable in accordance with the disclosure of the specification, the preferred embodiments of the present invention will be described in detail with reference to the accompanying drawings.

BRIEF DESCRIPTION OF THE DRAWINGS

FIG. 1 is a flow chart of a method for preparing an anti-counterfeiting modal fiber.

DETAILED DESCRIPTION OF THE PREFERRED EMBODIMENTS

The specific embodiments of the present invention will be described in further detail with reference to embodiments.

The following embodiments are intended to illustrate the present invention, instead of limiting the scope of the present invention.

Example 1

This example provides a method for preparing an anti-counterfeiting modal fiber, and a preparation method thereof. FIG. 1 shows a flow chart of the method, and the specific steps are as follows.

(1) The auxiliary agent JL-EBZ was added to a pulp stock solution, where JL-EBZ accounted for 0.6% by weight of the pulp stock solution. Then it was alkalized with sodium hydroxide. The pulp stock solution after alkalization was aged in an aging device. The aged pulp stock solution was sulfonated with $CS_2$, and the cellulose sulfonate after sulfonation was dissolved in a sodium hydroxide solution, to obtain a spinning viscose. Specific conditions for the alkalization, aging and sulfonation were as follows.

The alkalization was performed for 3 hrs with sodium hydroxide having a concentration of 18 g/L at 15° C., where the bath ratio was 1:7. The aging was performed in an aging device for 4 hrs at a temperature of 18° C. The sulfonation was to treat the pulp stock solution with $CS_2$ at 65° C. for 2 hrs, where the weight ratio of $CS_2$ to the pulp stock solution was 1:140.

(2) Amino acid-metal chelates were prepared. A compound amino acid and copper sulfate pentahydrate were mixed at a molar ratio of 3:1, and chelated for 30 min at pH 11 and a temperature of 60° C. The compound amino acid includes tyrosine, lysine, leucine, and valine, at a molar ratio of 4:3:2:1. The mixed solution obtained after the reaction was centrifuged, and the supernatant was collected to obtain an amino acid-copper chelate solution.

(3) The amino acid-copper chelate solution was added to the treated spinning viscose in Step (1) and mixed evenly, where the amino acid-copper chelate accounted for 0.5% by weight of the spinning viscose. Then after filtration and rapid continuous defoaming treatment, the spinning viscose was ripened in a ripening barrel to prepare a spinning stock solution. The ripening time was 7 hrs, and the treatment temperature was 15° C.

(4) The auxiliary agent JL-FS was added to the spinning stock solution, mixed well and wet spun to prepare a modal fiber, where JL-FS accounted for 0.15% by weight of the spinning stock solution. The spinning process was low-speed spinning, and the spinning speed was 28 m/min. High drafting is performed in a coagulation bath, with a total drafting rate of 80%; and low drafting is performed in the post-treatment with a total drafting rate of 25%. The spinning nozzle had a specification of Φ0.05 mm×36000 holes. The new fiber was defoamed, desulfurized and washed with water. The fiber was dried at 75° C., to obtained an encrypted modal fiber containing the amino acid-metal chelates. The temperature of the coagulation bath required for the drafting was 45° C., the coagulation bath included 90 g/L of sulfuric acid, 80 g/L of zinc sulfate, and 130 g/L of sodium sulfate, and the immersion time was 2 sec. The defoaming was performed for 0.5 hr by immersing the new fibers in a defoaming agent with a concentration of 0.8%, where the bath ratio was 1:15. The desulfurization was performed for 3 hrs in a 2 g/L sodium hydroxide solution at a temperature of 80° C., where the bath ratio was 1:12. The water washing was performed for 2 hrs with hot water at 85° C., where the bath ratio was 1:18.

Example 2

This example provides a method for preparing an anti-counterfeiting modal fiber, the specific steps are as follows.

(1) Following the same steps as those in Step (1) of Example 1, a spinning viscose was obtained.

(2) The amino acid-metal chelate was a chelate of tyrosine and copper sulfate pentahydrate. Tyrosine and copper sulfate pentahydrate were mixed at a molar ratio of 3:1, and chelated for 30 min at pH 10 and a temperature of 60° C. The mixed solution obtained after the reaction was centrifuged, and the supernatant was collected to obtain an amino acid-copper chelate solution.

(3) The amino acid-copper chelate solution obtained in Step (2) was added to the spinning viscose, where the amino acid-copper chelate accounted for 0.8% by weight of the spinning viscose. The rest of the steps were the same as those in Step (3) of Example 1.

(4) Following the same steps as those in Step (4) of Example 1, an anti-counterfeiting modal fiber was obtained.

Example 3

This example provides a method for preparing an anti-counterfeiting modal fiber. The specific steps are as follows.

(1) Following the same steps as those in Step (1) of Example 1, a spinning viscose was obtained.

(2) Two types of amino acid-metal chelate were prepared. A compound amino acid and iron chloride were mixed at a molar ratio of 2:1, and chelated for 30 min at pH 6 and a temperature of 25° C. The mixed solution obtained after the reaction was centrifuged, and the supernatant was collected to obtain an amino acid-iron chelate solution. A compound amino acid and copper sulfate pentahydrate were mixed at a molar ratio of 3:1, and chelated for 30 min at pH 11 and a temperature of 60° C. The compound amino acid includes tyrosine, lysine, leucine, and valine, at a molar ratio of 4:3:2:1. The mixed solution obtained after the reaction was centrifuged, and the supernatant was collected to obtain an amino acid-copper chelate solution.

(3) The amino acid-copper chelate solution and the amino acid-iron chelate solution obtained in Step (2) were added to the spinning viscose, and the amino acid-copper chelate and the amino acid-iron chelate accounted for 0.5% by weight of the spinning viscose respectively. The rest of the steps were the same as those in Step (3) of Example 1.

(4) Following the same steps as those in Step (4) of Example 1, an anti-counterfeiting modal fiber was obtained.

The anti-counterfeiting modal fiber prepared in Examples 1 to 3 was cut into pieces, and treated for 16 hrs by hydrolysis with a 40 g/L sodium hydroxide solution at a bath ratio of 1:4. The modal fiber solution was detected and tested by inductively coupled plasma spectroscopy, to determine the contents of metal elements. The species and contents of amino acids in the modal fiber solution were determined by capillary electrophoresis/mass spectrometry technology. The results are shown in Table 1. The contents of various substances in Table 1 refer to their percentages relative to the total weight of the modal fiber.

TABLE 1

| Content of amino acids and metal elements (%) | | | | | | |
|---|---|---|---|---|---|---|
| | Example 1 | | Embodiment 2 | | Example 3 | |
| | Before spinning | Determined value after spinning | Before spinning | Determined value after spinning | Before spinning | Determined value after spinning |
| $Cu^{2+}$ | 0.120 | 0.103 | 0.200 | 0.179 | 0.120 | 0.101 |
| $Fe^{3+}$ | — | — | — | — | 0.170 | 0.152 |
| Tyrosine | 0.150 | 0.132 | 0.600 | 0.459 | 0.282 | 0.255 |
| Lysine | 0.115 | 0.102 | — | — | 0.212 | 0.197 |
| Leucine | 0.075 | 0.056 | — | — | 0.141 | 0.128 |
| Valine | 0.038 | 0.025 | — | — | 0.705 | 0.573 |

The anti-counterfeiting method of the present invention is described with Example 3 as an example.

Before the anti-counterfeiting modal fiber is prepared, the amino acids and metal elements are encoded in advance according to the designed composition, where $Cu^{2+}$ is represented by the letter C, $Fe^{3+}$ is represented by the letter F, and tyrosine, lysine, leucine and valine are respectively represented by the numerals 1, 2, 3, and 4. The codes for the metal elements are arranged ahead of the codes for amino acids; and at the same time, they are ranked according to the content, and the one with a larger amount is in the front. Therefore, an anti-counterfeiting modal fiber having a target code of FC4123 is prepared in Example 3.

The target code of a modal fiber product and fiber is obtained by a user, and the obtained modal fiber is decrypted. When decrypted, the species and contents of amino acids and metal elements are detected following the above detection methods. According to the determined value after spinning in Table 1, it can be concluded that the anti-counterfeiting code detected in Example 3 is FC4123, which is compared with the target code, and found to be the same as the target code, suggesting that the user has obtained the desired target fiber. According to the above principle, the accuracy of the anti-counterfeiting codes of Examples 1 and 2 is verified. It is found that the anti-counterfeiting codes of Examples 1 and 2 both have extremely high accuracy, as Example 3 does.

Since the anti-counterfeiting modal fiber prepared in Example 1 contains the same metal ion and different amino acids, the encryption code has high encryption and anti-counterfeiting power and is easy to distinguish. The fiber source can be traced according to the anti-counterfeiting code. The anti-counterfeiting modal fiber produced in Example 2 is a modal fiber encrypted with an amino acid-metal chelate prepared with a single amino acid. There is an encryption effect, but the encryption power is insufficient. The cryptogram is simple and easy to be copied, so the tracking performance is greatly reduced, and the error probability is large. In Example 3, the spinning stock solution of modal fibers is encrypted by adding amino acid-metal chelates of two metal ions with multiple amino acids. In this manner, an anti-counterfeiting code that is difficult to decrypt is obtained. Compared with the encryption with a single metal element in Example 1, the encryption and anti-counterfeiting effect with multiple metal elements is greatly enhanced.

In addition, the effect of the method of the present invention on the mechanical performance of the modal fibers is tested, and the results are shown in Table 2.

TABLE 2

| Breaking strength and breaking elongation of modal fibers | | | | |
|---|---|---|---|---|
| | Conventional modal fiber | Example 1 | Example 2 | Example 3 |
| Dry breaking strength (cN/dtex) | 3.43 | 3.49 | 3.42 | 3.45 |
| Dry breaking elongation (%) | 13.1 | 13.3 | 13.2 | 13.3 |
| Wet breaking strength (cN/dtex) | 2.36 | 2.41 | 2.35 | 2.38 |
| Wet breaking elongation (%) | 14.4 | 14.7 | 14.3 | 14.5 |

According to the GB/T 14337-2008 Performance Test Methods for Chemical staple fiber stretch, the breaking strength and breaking elongation of the modal fibers prepared in Examples 1, 2, and 3 and the conventional modal fibers were tested using a fiber tension strength tester. The test results of various examples are compared. It is found that changes in the contents and species of amino acids and metal elements have little influence on the mechanical performance of modal fibers, and do not cause huge fluctuations in the mechanical performance of modal fibers.

While preferred embodiments of the present invention have been described above, the present invention is not limited thereto. It should be appreciated that some improvements and variations can be made by those skilled in the art without departing from the technical principles of the present invention, which are also contemplated to be within the scope of the present invention.

What is claimed is:

1. A method for preparing an anti-counterfeiting modal fiber, comprising steps of:

(1) mixing a pulp stock solution with a cellulose catalyst, alkalizing, aging, sulfonating, and then dissolving the pulp stock solution in an alkaline solution to obtain a treatment solution; and (2) mixing the treatment solution uniformly with a plurality of amino acid-metal chelates, filtering, defoaming and ripening to obtain a spinning stock solution; and mixing the spinning stock solution uniformly with a spinning bath additive, and wet spinning, followed by post-treatments, to obtain the anti-counterfeiting modal fiber, wherein the amino acid metal-chelates account for 0.5%-1.5% by weight of the spinning stock solution.

2. The preparation method according to claim 1, wherein in Step (1), the cellulose catalyst is JL-EBZ; and the cellulose catalyst accounts for 0.3%-1.8% by weight of the pulp stock solution.

3. The preparation method according to claim 1, wherein in Step (1), the pulp stock solution has a degree of polymerization of ≥850, and a methylcellulose content of ≥92%.

4. The preparation method according to claim 1, wherein in Step (2), the amino acid-metal chelates comprise an amino acid and a metal ion chelated with the amino acid, and the molar ratio of the amino acid to the metal ion is 2-3:1.

5. The preparation method according to claim 4, wherein the amino acid is selected from the group consisting of tyrosine, lysine, leucine, valine, phenylalanine and any combination thereof and the metal ion is selected from a copper ion, a calcium ion, a iron ion and any combination thereof.

6. The preparation method according to claim 1, wherein in Step (2), the spinning bath additive is JL-FS; and the spinning bath additive accounts for 0.1%-0.25% by weight of the spinning stock solution.

7. The preparation method according to claim 1, wherein in Step (2), the wet spinning is low-speed spinning, and the spinning speed is 28-33 m/min; high drafting is performed in a coagulation bath, with a total drafting rate of 75%-85%; and low drafting is performed in post-treatment, with a total drafting rate of 20%-30%.

8. An anti-counterfeiting modal fiber prepared by the method according to claim 1, comprising modal fibers and multiple amino acid-metal chelates distributed in the modal fibers, wherein the amino acid-metal chelates account for 0.5%-1.5% by weight of the anti-counterfeiting modal fiber.

9. An anti-counterfeiting method using the anti-counterfeiting modal fiber according to claim 8, comprising an encryption step, and a decryption and identification step, wherein the encryption step comprises encoding the anti-counterfeiting modal fiber according to the species and amounts of the amino acid-metal chelates, and sending encrypted information; and the decryption and identification step comprises obtaining the encrypted information, and testing the species and amounts of amino acids and metal ions in the modal fiber; and then comparing with the obtained encrypted information to identify the authenticity of the modal fiber.

* * * * *